United States Patent
Zhu et al.

(10) Patent No.: US 8,626,227 B2
(45) Date of Patent: Jan. 7, 2014

(54) METHOD AND SYSTEM FOR POWER ALLOCATION IN A TRANSMISSION SYSTEM

(75) Inventors: Chenxi Zhu, Palo Alto, CA (US); Wei-Peng Chen, Fremont, CA (US)

(73) Assignee: Fujitsu Limited, Kawasaki-shi (JP)

( * ) Notice: Subject to any disclaimer, the term of this patent is extended or adjusted under 35 U.S.C. 154(b) by 447 days.

(21) Appl. No.: 12/966,266

(22) Filed: Dec. 13, 2010

(65) Prior Publication Data

US 2012/0149410 A1    Jun. 14, 2012

(51) Int. Cl.
    *H04B 7/00*     (2006.01)

(52) U.S. Cl.
USPC ....... 455/522; 455/127.1; 455/13.4; 370/252; 370/318; 375/270; 375/296

(58) Field of Classification Search
USPC ............... 455/69, 454, 702, 522, 127.1, 13.4, 455/501; 370/208, 230, 232, 252, 207, 210, 370/320, 343, 344, 329; 375/260, 296, 210, 375/130, 278, 150, 239, 267
See application file for complete search history.

(56) References Cited

U.S. PATENT DOCUMENTS

| | | | | |
|---|---|---|---|---|
| 7,965,649 | B2 * | 6/2011 | Tee et al. | 370/252 |
| 2005/0031047 | A1 | 2/2005 | Maltsev et al. | 375/260 |
| 2005/0099937 | A1 * | 5/2005 | Oh et al. | 370/207 |
| 2006/0109923 | A1 | 5/2006 | Cai et al. | 375/260 |
| 2009/0161783 | A1 * | 6/2009 | Ozluturk | 375/260 |
| 2009/0219800 | A1 | 9/2009 | Bocquet | 370/208 |
| 2009/0296574 | A1 * | 12/2009 | Liao et al. | 370/230 |
| 2012/0113924 | A1 * | 5/2012 | Kashiwagi et al. | 370/329 |
| 2012/0170466 | A1 * | 7/2012 | Lee et al. | 370/252 |

OTHER PUBLICATIONS

Extended European Search Report; Application No. 1190583.2-1246; pp. 10, Mar. 5, 2012.
Santipach et al.; "Signature Optimization for CDMA With Limited Feedback"; IEEE Transactions on Information Theory, vol. 51, No. 10; pp. 3475-3492, Oct. 2005.
Wang et al.; "Power Allocation in OFDM-Based Cognitive Radio Systems"; Cognitive Radio Systems, InTech; pp. 231-260, Nov. 1, 2009.
Wang et al.; "Resource Allocation for Heterogeneous Services in Multiuser OFDM Systems"; IEEE Communications Society; Globecom '04; pp. 3478-3481, 2004.

* cited by examiner

*Primary Examiner* — Sujatha Sharma
(74) *Attorney, Agent, or Firm* — Baker Botts L.L.P.

(57) ABSTRACT

In accordance with embodiments of the present disclosure, a method and system for allocating power in a transmission system may be provided. A method may include determining a channel quality for each of a plurality of subcarriers, wherein the channel quality for each individual subcarrier is equal to the signal-to-interference and noise ratio for the individual subcarrier divided by the power allocated to the subcarrier. The method may also include allocating power to a subset of the plurality of subcarriers, wherein each individual subcarrier of the subset has a channel quality greater then each individual subcarrier not of the subset. The method may further include transmitting a signal on each of the individual subcarriers of the subset.

16 Claims, 2 Drawing Sheets

METHOD AND SYSTEM FOR POWER ALLOCATION IN A TRANSMISSION SYSTEM

TECHNICAL FIELD

The present disclosure relates generally to wireless communication and, more particularly, to power allocation among subchannels in wireless communication devices.

BACKGROUND

Wireless communications systems are used in a variety of telecommunications systems, television, radio and other media systems, data communication networks, and other systems to convey information between remote points using wireless transmitters and wireless receivers. A transmitter is an electronic device which, usually with the aid of an antenna, propagates an electromagnetic signal such as radio, television, or other telecommunications. Transmitters often include signal amplifiers which receive a radio-frequency or other signal, amplify the signal by a predetermined gain, and communicate the amplified signal. On the other hand, a receiver is an electronic device which, also usually with the aid of an antenna, receives and processes a wireless electromagnetic signal. In certain instances, a transmitter and receiver may be combined into a single device called a transceiver.

3rd Generation Partnership Project (3GPP) Long Term Evolution (LTE) and LTE-Advanced standards are default standards for 4th generation wireless communication networks. LTE and LTE-Advanced utilize single carrier orthogonal frequency-division multiple access (SC-FDMA) as the basis for the uplink PHY layer of a wireless communications device. SC-FDMA is a particular type of orthogonal frequency-division multiplexing (OFDM).

An wireless communication network may be configured to combine modulated signals at various frequencies (also known as "channels"). Each disparate channel may include encoded information to be communicated throughout the wireless communication network. Each frequency (or carrier) may carry multiple sub-carriers using frequency-division multiplexing (FDM).

Orthogonal frequency-division multiplexing (OFDM) is a FDM scheme in which a plurality of closely-spaced orthogonal sub-carriers is used to carry data. The data is divided into several parallel data channels, one for each sub-carrier. OFDM modulation may be implemented using inverse discrete Fourier transformation (IDFT) and a modulator instead of using multiple modulators and oscillators for subcarriers as is the case in traditional FDM. The demodulation is also achieved using discrete Fourier transformation (DFT) instead of using multiple filters and oscillators for subcarriers. The separation of subcarrier channels is the integer multiple of the inverse observation period for a symbol to assure orthogonality.

A conventional SC-FDMA transmitter allocates its transmission power evenly in all of the subcarriers it uses. Because different subcarriers may experience varying levels of noise and interference, the signal-to-interference and noise (SINR) ratio may vary across subcarriers, and certain subcarriers may have relatively low SINR.

SUMMARY

In accordance with some embodiments of the present disclosure, a method may include determining a channel quality for each of a plurality of subcarriers, wherein the channel quality for each individual subcarrier is equal to the signal-to-interference and noise ratio for the individual subcarrier divided by the power allocated to the subcarrier. The method may also include allocating power to a subset of the plurality of subcarriers, wherein each individual subcarrier of the subset has a channel quality greater then each individual subcarrier not of the subset. The method may further include transmitting a signal on each of the individual subcarriers of the subset.

Technical advantages of one or more embodiments of the present disclosure may include improvement in signal-to-interference and noise ratios in wireless communication elements.

It will be understood that the various embodiments of the present disclosure may include some, all, or none of the enumerated technical advantages. In addition, other technical advantages of the present disclosure may be readily apparent to one skilled in the art from the figures, description and claims included herein.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1:
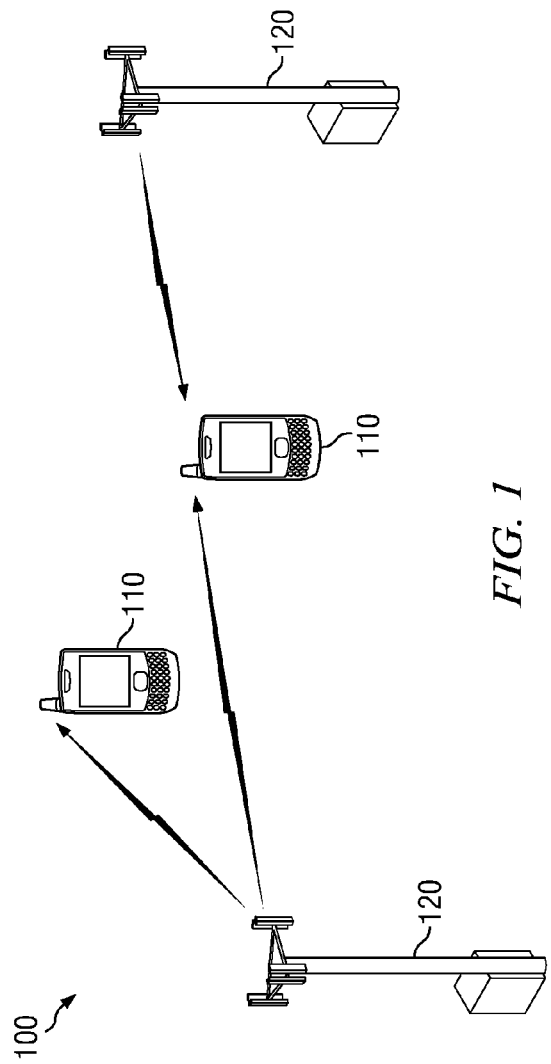
FIG. 1 illustrates a block diagram of an example wireless communication system, in accordance with certain embodiments of the present disclosure.

FIG. 1 illustrates a block diagram of an example wireless communication system 100, in accordance with certain embodiments of the present disclosure. System 100 may be a SC-FDMA system, or other suitable wireless communication system. For simplicity, only two terminals 110 and two base stations 120 are shown in FIG. 1. A terminal 110 may also be referred to as a remote station, a mobile station, an access terminal, user equipment (UE), a wireless communication device, a cellular phone, or some other terminology. A base station 120 may be a fixed station and may also be referred to as an access point, a Node B, or some other terminology.

In FIG. 1, each terminal 110 is shown as receiving signals from multiple transmitting sources simultaneously, where a transmitting source may be a base station 120. In certain embodiments, a terminal 110 may also be a transmitting source. In general, a terminal 110 may receive signals from zero, one, or multiple transmitting sources at any given moment.

Figure 2:
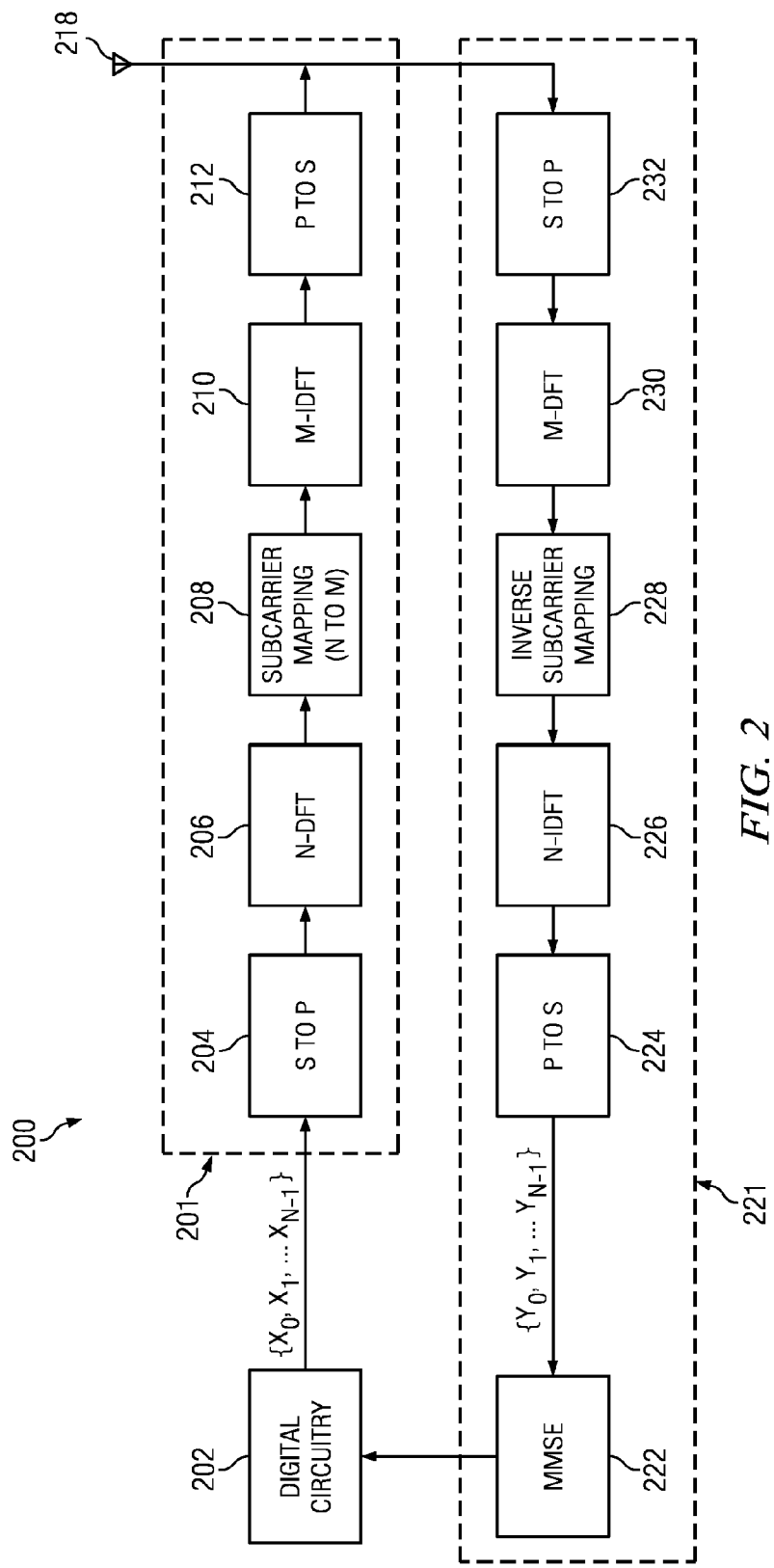
FIG. 2 illustrates a block diagram of selected components of an example wireless communication element, in accordance with certain embodiments of the present disclosure.

FIG. 2 illustrates a block diagram of selected components of an example transmitting and/or receiving element 200 (e.g., a terminal 110, a base station 120, or a satellite 130), in accordance with certain embodiments of the present disclosure. Element 200 may include a transmit path 201 and/or a receive path 221. Depending on the functionality of element 200, element 200 may be considered a transmitter, a receiver, or a transceiver. In addition, in certain embodiments transmit path 201 may be considered a transmitter, while receiver path 221 may be considered a receiver.

As depicted in FIG. 2, element 200 may include digital circuitry 202. Digital circuitry 202 may include any system, device, or apparatus configured to process digital signals and information received via receive path 221, and/or configured to process signals and information for transmission via transmit path 201. Such digital circuitry 202 may include one or more microprocessors, digital signal processors, and/or other suitable devices.

Transmit path 201 may include a serial-to-parallel converter 204, a discrete Fourier transform block 206, a subcarrier mapping block 208, an inverse discrete Fourier transform block 210, and a parallel-to-serial converter 212. Serial-to-parallel converter 204 may be configured to convert a serial data stream representing data for N points (e.g., $X_0, X_1, \ldots X_{N-1}$) into parallel discrete data, wherein each of the N points may correspond to a subcarrier channel. Discrete Fourier transform block 206 may be configured to receive the parallel discrete data from serial-to-parallel converter 204 and perform a discrete Fourier transform on the data to produce an N-point symbol. Subcarrier mapping block 208 may be configured to receive data from discrete Fourier transform block 206 and map the N-point symbol into M subcarriers each with a particular bandwidth (e.g., 15 kHz).

Inverse discrete Fourier transform block 210 may be configured to perform an inverse discrete Fourier transform on the M subcarriers produced by subcarrier mapping block 208. Parallel-to-serial converter 212 may receive parallel data from inverse discrete Fourier transform block 210 and convert the parallel data to a serial data stream. Antenna 218 may receive the serial data stream and transmit such data stream (e.g., to one or more of a terminal 110, a base station 120, and/or a satellite 130).

Receive path 221 may include a serial-to-parallel converter 232, discrete Fourier transform block 230, inverse subcarrier mapping block 228, inverse discrete Fourier transform block 226, parallel-to-serial converter 224, and minimal mean square error (MMSE) receiver 222. Serial-to-parallel converter 232, discrete Fourier transform block 230, inverse subcarrier mapping block 228, inverse discrete Fourier transform block 226, and parallel-to-serial converter 224 may perform the inverse of the functions of parallel-to-serial converter 232, inverse discrete Fourier transform block 210, subcarrier mapping block 208, discrete Fourier transform block 206, and serial-to-parallel converter 204, respectively. MMSE receiver 222 may be configured to receive a serial data stream from parallel-to-serial converter 224, and minimize the mean square error of the serial data stream, as is known in the art, thereby maximizing effective SINR of the receive path 221 and reducing error probability.

As is known in the art, the output SINR of an MMSE receiver 222 may be given by:

$$SINR = \frac{1}{\frac{1}{N}\sum_{k=1}^{N}\frac{1}{1+\gamma_k}} - 1$$

where $\gamma_k$ is the physical SINR of the kth subcarrier.

To maximize the SINR of MMSE receiver 222 given the above equation, it is desirable to minimize the term:

$$\sum_{k=1}^{N}\frac{1}{1+\gamma_k}$$

The SINR of an individual subcarrier k, $\gamma_k$ may be given as:

$$\gamma_k = \frac{P \cdot |C_k|^2}{|NI_k|^2}$$

where P is the transmitted signal power for the subchannel k, $|C_k|^2$ is the channel feature in power form for a particular subchannel k, and $\overline{|NI_k|}^2$ is the noise interference power. The channel feature represents the aggregate effect of subcarrier mapping block 208 and inverse Fourier transform block 210 of an element 200 transmitting a signal, the physical channel coefficient in the frequency domain during transmission between a transmit path 201 and a receive path 221, and a discrete Fourier transfer block 230 and inverse subcarrier mapping block 228 of an element 200 receiving a signal. The channel feature and noise interference power may not be controllable. However, the transmitted power in a subchannel may be controlled in order to reduce the SINR for the subchannel.

Assuming that all power transmitted in active subcarriers, $P_T$, remains constant, the transmitted power on each subcarrier may be individually adjusted subject to $P_T$. By applying Lagrange multipliers to $P_T$ and a channel quality $d_k$, where:

$$P_T = \sum_{k=1}^{N} P_k; \text{ and } d_k = \frac{|C_k|^2}{|NI_k|^2}$$

the optimal transmitted power $p_i$ for a subcarrier i is:

$$p_i = \frac{1}{\sqrt{d_i}} \frac{P_T + \sum_{k=1}^{N}\frac{1}{d_k}}{\sum_{k=1}^{N}\frac{1}{d_k}} - \frac{1}{d_i}$$

Because it is necessary that $p_i \geq 0$, the optimal power $p_i$ becomes:

$$p_i = \frac{1}{\sqrt{d_i}} \frac{P_T + \sum_{k \in \kappa}\frac{1}{d_k}}{\sum_{k \in \kappa}\frac{1}{d_k}} - \frac{1}{d_i}, i \in \kappa\ 0, i \in \overline{\kappa}$$

where $\kappa$ is the set of active subcarriers and $\overline{\kappa}$ is the complementary set of $\kappa$ which includes all of the inactive subcarriers allocated to a user.

Figure 3:
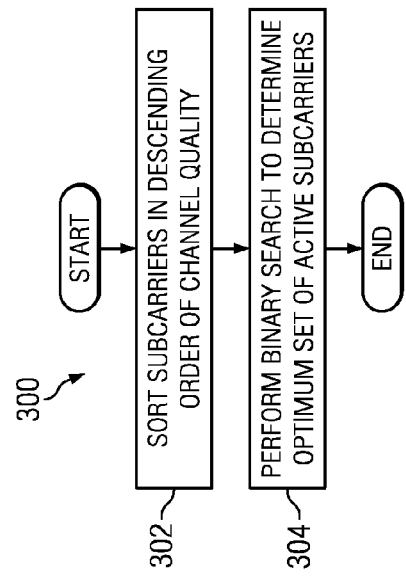
FIG. 3 illustrates a flow chart of an example method of determining an optical set of active subcarriers, in accordance with certain embodiments of the present disclosure.

FIG. 3 illustrates a flow chart of an example method 300 of determining an optimal set of active subcarriers, in accordance with certain embodiments of the present disclosure. Method 300 may be implemented using a wireless communication element 200. In certain embodiments, method 300 may be implemented partially or fully in software and/or firmware embodied in computer-readable media. For example, digital circuitry 202 may comprise a processor and a memory whereby the memory stores executable instructions for performing method 300 and the processor executes the instructions in order to perform method 300.

At step 302, a processor or other suitable component of wireless communication element 200 may sort the set A of N subcarriers allocated to a user in descending order of their channel quality $d_i$, and then may renumber the subcarriers such that $d_i > d_j$, $i < j$. With the carriers so renumbered, there exists an index K such that $\kappa = \{1, 2, \ldots K\}$ and $\bar{\kappa} = (K+1, K+2, N)$, and the following are true:

$$\frac{1}{\sqrt{d_K}} < \frac{P_T}{\sum_{i=1}^{K} \frac{1}{d_i}} + 1; \text{ and}$$

$$\frac{1}{\sqrt{d_{K-1}}} \geq \frac{P_T}{\sum_{i=1}^{K+1} \frac{1}{d_i}} + 1$$

At step 304, a processor or other suitable component of wireless communication element 200 may perform a binary search to determine the optimum set of active subcarriers κ. To perform the binary search, a processor or other suitable component of wireless communication element 200 may define the following function:

$$C(l) = I\left(\frac{1}{\sqrt{d_l}} < \frac{P_T}{\sum_{i=1}^{l} \frac{1}{d_i}} + 1\right)$$

where $I(x)$ is an indicator function such that $I(x)=1$ is condition x is true, and $I(x)=0$ is condition x is false. The processor or other suitable component may perform the binary search in accordance with the following procedure or any other suitable procedure:

1. If C(N)=1, set K=N and exit.
2. Set $k_L$=1 and set $k_H$=N.
3. If $k_H$=$k_L$+1, set K=$k_L$ and exit.
4. Set k=min(($k_L$+$k_H$)/2, N−1).
5. If C(k)=1 and C(k+1)=0, set K=k and exit.
6. If C(k+1)=1, then set $k_L$=k+1 and go to line 3.
7. If C(k)=0, then set $k_H$=k−1 and go to line 3.

At line 1, a processor or other suitable component of wireless communication element 200 may determine if the Nth element of the set A meets the condition C. If so, the set of active carriers K includes all N subcarriers. Thus, K may be set equal to N, and the procedure may exit.

At line 2, a processor or other suitable component of wireless communication element 200 may initialize variables $k_L$ and $k_H$ to the first and last members of the set A, in order to set initial bounds on the binary search.

At line 3, a processor or other suitable component of wireless communication element 200 may determine if variables $k_L$ and $k_H$ representing the then-present bounds of the binary search differ by one (e.g., represent adjacent subcarriers). If so, the set of active carriers K includes the first $k_L$ subcarriers. Thus, K may be set equal to $k_L$, and the procedure may exit.

At line 4, a processor or other suitable component of wireless communication element 200 may set a temporary variable k to equal the minimum of: (i) the quantity $k_L$+$k_H$ divided by 2 and (ii) N minus 1. Accordingly, the variable k is set to a value in the middle of the then-present search space.

At line 5, a processor or other suitable component of wireless communication element 200 may determine if C(k) equals 1 and C(k+1) equals 0. If so, the set of active carriers K includes the first k subcarriers. Thus, K may be set equal to k, and the procedure may exit.

At line 6, a processor or other suitable component of wireless communication element 200 may determine if C(k+1) equals 1. If so, the set of active carriers K includes at least the first k+1 subcarriers. Thus, $k_L$ may be set to k+1 (to reset the lower bound of the search space) and the procedure may return to line 3.

At line 7, a processor or other suitable component of wireless communication element 200 may determine if C(k)=0. If so, the set of active carriers κ includes at no more than the first k−1 subcarriers. Thus, $k_H$ may be set to k−1 (to reset the higher bound of the search space) and the procedure may return to line 3.

A component of system 100 may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible computer readable storage media and may perform operations when executed by a computer. Certain logic, such as a processor, may manage the operation of a component. Examples of a processor include one or more computers, one or more microprocessors, one or more applications, and/or other logic.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to system 100 from the scope of the disclosure. The components of system 100 may be integrated or separated. Moreover, the operations of system 100 may be performed by more, fewer, or other components. As used in this document, "each" refers to each member of a set or each member of a subset of a set.

Although the present disclosure has been described with several embodiments, various changes and modifications may be suggested to one skilled in the art. It is intended that the present disclosure encompass such changes and modifications as fall within the scope of the appended claims.

What is claimed is:

1. A method for increasing signal-to-interference and noise ratio, comprising:
    determining a channel quality for each of a plurality of subcarriers, wherein the channel quality for each individual subcarrier a function of the signal-to-interference to noise ratio for the individual subcarrier and the power allocated to the subcarrier;
    allocating power to a subset of the plurality of subcarriers, wherein each individual subcarrier of the subset has a channel quality greater then each individual subcarrier not of the subset, wherein allocating power to the subset of the plurality of subcarriers comprises:

sorting the plurality of subcarriers in descending order of their respective channel qualities to generate a sorted set of subcarriers;
determining a subcarrier K in the sorted set such that the following condition is true:

$$\frac{1}{\sqrt{d_K}} < \frac{P_T}{\sum_{i=1}^{K} \frac{1}{d_i}} + 1$$

where $d_k$ is the channel quality of the subcarrier K, $P_T$ is the total power allocated to all subcarriers, and $d_i$ is the channel quality of a subcarrier i of the sorted set; and
allocating power to subcarrier K and subcarriers having a channel quality greater than subcarrier K; and
transmitting a signal on each of the individual subcarriers of the subset.

2. A method according to claim 1, wherein the subset includes all of the plurality of subcarriers.

3. A method according to claim 1, wherein allocating power to the subset comprises allocating power to each subcarrier of the subset based on the equation $$p_i = \frac{1}{\sqrt{d_i}} \frac{P_T + \sum_{k \in \kappa} \frac{1}{d_k}}{\sum_{k \in \kappa} \frac{1}{d_k}} - \frac{1}{d_i}$$

where $p_i$ is the power allocated to a subcarrier i of the subset, $P_T$ is the total power allocated to all subcarriers, $d_i$ is the channel quality of a subcarrier i of the subset, $d_k$ is the channel quality of a subcarrier k of the subset, and κ is the subset.

4. A method according to claim 1, wherein determining the subcarrier K comprises performing a binary search on the sorted set.

5. A wireless communication element comprising:
a processor configured to:
determine a channel quality for each of a plurality of subcarriers, wherein the channel quality for each individual subcarrier a function of the signal-to-interference to noise ratio for the individual subcarrier and the power allocated to the subcarrier; and
allocate power to a subset of the plurality of subcarriers, wherein each individual subcarrier of the subset has a channel quality greater then each individual subcarrier not of the subset, wherein allocating power to the subset of the plurality of subcarriers comprises:
sorting the plurality of subcarriers in descending order of their respective channel qualities to generate a sorted set of subcarriers;
determining a subcarrier K in the sorted set such that the following condition is true:

$$\frac{1}{\sqrt{d_K}} < \frac{P_T}{\sum_{i=1}^{K} \frac{1}{d_i}} + 1$$

where $d_k$ is the channel quality of the subcarrier K, $P_T$ is the total power allocated to all subcarriers, and $d_i$ is the channel quality of a subcarrier i of the sorted set; and
allocating power to subcarrier K and subcarriers having a channel quality greater than subcarrier K; and
a transmit path communicatively coupled to the processor and configured to transmit a signal on each of the individual subcarriers of the subset.

6. A wireless communication element according to claim 5, wherein the subset includes all of the plurality of subcarriers.

7. A wireless communication element according to claim 5, the processor further configured to allocate power to each subcarrier of the subset based on the equation $$p_i = \frac{1}{\sqrt{d_i}} \frac{P_T + \sum_{k \in \kappa} \frac{1}{d_k}}{\sum_{k \in \kappa} \frac{1}{d_k}} - \frac{1}{d_i}$$

where $p_i$ is the power allocated to a subcarrier i of the subset, $P_T$ is the total power allocated to all subcarriers, $d_i$ is the channel quality of a subcarrier i of the subset, $d_k$ is the channel quality of a subcarrier k of the subset, and κ is the subset.

8. A wireless communication element according to claim 5, the processor further configured to perform a binary search on the sorted set in order to determine the subcarrier K.

9. A system for increasing signal-to-interference and noise ratio, comprising:
logic for determining a channel quality for each of a plurality of subcarriers, wherein the channel quality for each individual subcarrier a function of the signal-to-interference to noise ratio for the individual subcarrier and the power allocated to the subcarrier;
logic for allocating power to a subset of the plurality of subcarriers, wherein each individual subcarrier of the subset has a channel quality greater then each individual subcarrier not of the subset, wherein allocating power to the subset of the plurality of subcarriers comprises:
sorting the plurality of subcarriers in descending order of their respective channel qualities to generate a sorted set of subcarriers;
determining a subcarrier K in the sorted set such that the following condition is true:

$$\frac{1}{\sqrt{d_K}} < \frac{P_T}{\sum_{i=1}^{K} \frac{1}{d_i}} + 1$$

where $d_k$ is the channel quality of the subcarrier K, $P_T$ is the total power allocated to all subcarriers, and $d_i$ is the channel quality of a subcarrier i of the sorted set; and
allocating power to subcarrier K and subcarriers having a channel quality greater than subcarrier K; and
logic for transmitting a signal on each of the individual subcarriers of the subset.

10. A system according to claim 9, wherein the subset includes all of the plurality of sub carriers.

11. A system according to claim 9, wherein the logic for allocating power to the subset comprises logic for allocating power to each subcarrier of the subset based on the equation $$p_i = \frac{1}{\sqrt{d_i}} \frac{P_T + \sum_{k \in \kappa} \frac{1}{d_k}}{\sum_{k \in \kappa} \frac{1}{d_k}} - \frac{1}{d_i}$$

where $p_i$ is the power allocated to a subcarrier i of the subset, $P_T$ is the total power allocated to all subcarriers, $d_i$ is the channel quality of a subcarrier i of the subset, $d_k$ is the channel quality of a subcarrier k of the subset, and κ is the subset.

12. A system according to claim 9, wherein the logic for determining the subcarrier K comprises logic for performing a binary search on the sorted set.

13. An article of manufacture comprising:

a non-transitory computer-readable medium;

one or more computer-readable instructions embodied on the computer-readable medium and configured to, when executed by a processor:

determine a channel quality for each of a plurality of subcarriers, wherein the channel quality for each individual subcarrier a function of the signal-to-interference to noise ratio for the individual subcarrier and the power allocated to the subcarrier;

allocate power to a subset of the plurality of subcarriers, wherein each individual subcarrier of the subset has a channel quality greater then each individual subcarrier not of the subset, wherein allocating power to the subset of the plurality of subcarriers comprises:

sorting the plurality of subcarriers in descending order of their respective channel qualities to generate a sorted set of subcarriers;

determining a subcarrier K in the sorted set such that the following condition is true:

$$\frac{1}{\sqrt{d_K}} < \frac{P_T}{\sum_{i=1}^{K} \frac{1}{d_i}} + 1$$

where $d_K$ is the channel quality of the subcarrier K, $P_T$ is the total power allocated to all subcarriers, and $d_i$ is the channel quality of a subcarrier i of the sorted set; and allocating power to subcarrier K and subcarriers having a channel quality greater than subcarrier K; and transmit a signal on each of the individual subcarriers of the subset.

14. An article of manufacture according to claim 13, wherein the subset includes all of the plurality of subcarriers.

15. An article of manufacture according to claim 13, the one or more instructions further configured to, when executed, allocate power to each subcarrier of the subset based on the equation $$p_i = \frac{1}{\sqrt{d_i}} \frac{P_T + \sum_{k \in \kappa} \frac{1}{d_k}}{\sum_{k \in \kappa} \frac{1}{d_k}} - \frac{1}{d_i}$$

where $p_i$ is the power allocated to a subcarrier i of the subset, $P_T$ is the total power allocated to all subcarriers, $d_i$ is the channel quality of a subcarrier i of the subset, $d_k$ is the channel quality of a subcarrier k of the subset, and κ is the subset.

16. An article of manufacture according to claim 13, the one or more instructions further configured to perform a binary search on the sorted set in order to determine the subcarrier K.

* * * * *